(12) United States Patent
Fey et al.

(10) Patent No.: US 7,139,159 B2
(45) Date of Patent: Nov. 21, 2006

(54) SENSOR DEVICE

(75) Inventors: Wilhelm Fey, Dirmstein (DE); Ernst Krause, Oftersheim (DE)

(73) Assignee: Pepperl + Fuchs GmbH, Mannheim-Schoenau (DE)

( * ) Notice: Subject to any disclaimer, the term of this patent is extended or adjusted under 35 U.S.C. 154(b) by 645 days.

(21) Appl. No.: 10/380,472

(22) PCT Filed: Sep. 19, 2001

(86) PCT No.: PCT/EP01/10841

§ 371 (c)(1),
(2), (4) Date: Mar. 20, 2003

(87) PCT Pub. No.: WO02/29364

PCT Pub. Date: Apr. 11, 2002

(65) Prior Publication Data

US 2003/0169167 A1 Sep. 11, 2003

(30) Foreign Application Priority Data

Sep. 22, 2000 (DE) .............................. 100 47 113

(51) Int. Cl.
*H01H 47/00* (2006.01)
(52) U.S. Cl. .................................................. 361/115
(58) Field of Classification Search ................. 361/115
See application file for complete search history.

(56) References Cited

U.S. PATENT DOCUMENTS 3,899,698 A * 8/1975 Kleinschmidt .............. 310/328
4,392,074 A * 7/1983 Kleinschmidt et al. ..... 310/327

FOREIGN PATENT DOCUMENTS

| DE | 4100634 A1 | 7/1992 |
| DE | 4205029 C1 | 2/1993 |
| DE | 19846639 A1 | 4/2000 |
| DE | 19854450 A1 | 6/2000 |
| EP | 0372442 A2 | 6/1990 |
| EP | 0512161 A2 | 11/1992 |
| JP | 06-060788 | 3/1994 |
| WO | WO 9306572 A1 | 4/1993 |

* cited by examiner

Primary Examiner—Stephen W. Jackson
(74) Attorney, Agent, or Firm—Jacobson Holman PLLC

(57) ABSTRACT

The invention relates to a sensor device, particularly a limit or threshold value sensor device with a sensor system for detecting an external measured quantity, a switching device being provided for switching a load circuit.

The known design of the switching device by means of transistors or electromechanical relays has always necessitated compromises with regards to the electronic functionality, design of the circuit and arrangement on or with the sensor device.

The solution provided by the invention is a switching device with an almost wattless drive and galvanic separation or isolation between the control circuit and output circuit, the sensor system being constructed independent of the load circuit.

25 Claims, 7 Drawing Sheets

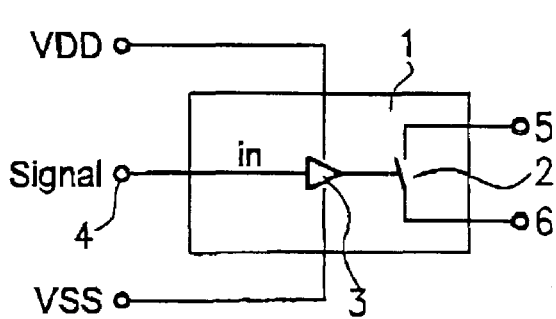
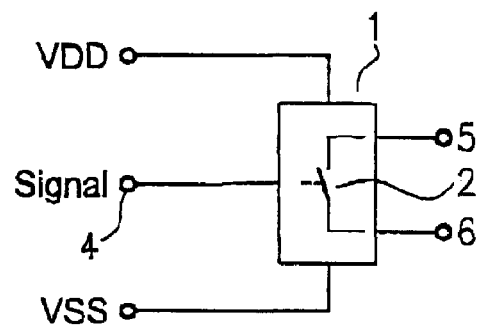
FIG.1a     FIG.1b
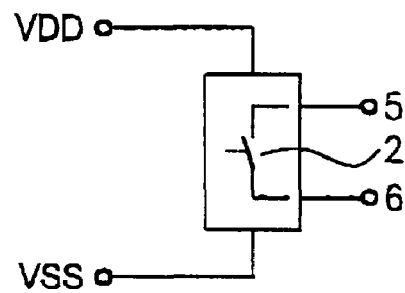
FIG.1c
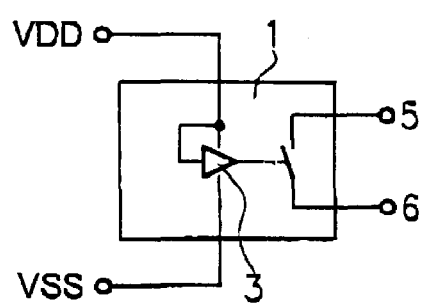
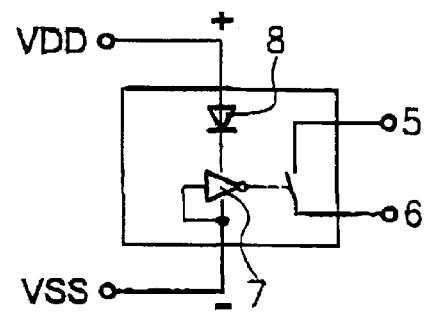
FIG.1d     FIG.1e

SENSOR DEVICE

This is a nationalization of PCT/EP01/10841 filed Sep. 19, 2001 and published in German.

The invention relates to a sensor device, particularly a limit or threshold value sensor device, having a sensor system for the detection of a measured quantity and a switching device for switching a load circuit and which is associated with the sensor system.

The term sensor system is fundamentally understood to mean hereinafter any type of sensor system, which essentially comprises a corresponding measuring probe, the mechanical design and a corresponding adaptation or matching electronics. Said matching electronics consequently has the corresponding output circuit for driving a load circuit at the output associated with the sensor system.

The specific sensor system type used as a basis here is a threshold value sensor system, which on reaching a predetermined value, which can be of an analog or binary nature, operates one or more switching outputs. Such a threshold value sensor system consequently combines a measuring probe or pick-up with the matching electronics, which has the evaluation and output function, within the corresponding sensor system.

Such sensor systems are hereinafter understood to relate e.g. to inductive and capacitive proximity switches, optoelectronic sensors, ultrasonic proximity switches, magnetic and magnetic field sensors, as well as level sensors.

A problem with such sensor devices is that the switching device in the output circuit for driving a load circuit or a corresponding load is constructed either as a transistor or transistor stage or alternatively in electromechanical relay form.

If the transistor solution is adopted for the switching device, the possibility admittedly existed to construct it on a layout with corresponding matching electronics of the sensor. However, a vital disadvantage was that between the control circuit and the load circuit in the case of a simple, inexpensive construction, no galvanic separation was provided, so that potential delays could arise. The problem also arose with the transistor that it cannot switch a.c. voltages.

When using an electromechanical relay as the switching device in the output circuit, it was necessary to take account of the disadvantages of a relatively large size, together with a relatively high driving power of e.g. 200 mW.

It is not apparent that within the foreseeable future it will be possible to solve the disadvantages of solutions with conventional electromechanical relays with respect to power consumption, HF suitability, size and maximum number of switching operations, as a result of a continuous further development in the field of such relays.

DE 198 54 450 A1 and DE 42 05 029 C1 describe manufacturing methods for silicon-based micromechanical relays. Essentially use is made of semiconductor and in particular silicon technology methods. Microrelays are characterized by an electrostatic switching principle and consequently by very low driving powers.

JP 06 060 788 A discloses a piezoelectric microrelay with reduced energy consumption.

An application of micromechanical relays is disclosed by DE 41 00 634 A1. A plurality of microrelays is interconnected therein in matrix-like manner in a testing device for testing assembled printed circuit boards.

A further possible use for micromechanical relays is described in DE 198 46 639 A1. To obtain particularly high switching voltages and currents, a plurality of microrelays are connected in series or parallel therein in a switchboard. Compared to an alternatively usable protection much shorter response times result from the use of microrelays.

The object of the invention is to provide a sensor device, particularly a limit or threshold value sensor device with a miniaturized switching device in the output area permitting both a modular construction and an improved driving of the switching device with high switching speed and a large number of switching cycles.

According to the invention this object is achieved in the case of a sensor device having the features of claim 1.

An essential principle consists of using an essentially micromechanical switching device. In other words a switching device is provided having at least one switching element, which can also be referred to as a micromechanical switch, but having extremely low-power drive and e.g. operable according to the electrostatic or piezoelectric principle. This microdevice preferably has in the case of a sandwich structure in the form of a semiconductor chip, micromechanical components including the possibly necessary electronics. The advantages of the transistor as to its miniaturization, low driving power and high switching speed, etc. are maintained in the same way as the relatively simple integration possibility within the framework of the same layout with the matching electronics for the remaining sensor device. In the case of this switching device design the advantages of electromechanical relays are also retained, particularly the galvanic separation or isolation between the control circuit of the switching device and the load circuit, together with the galvanic separation or isolation of the load circuit terminals. The design of the sensor device and the use of the switching device in accordance with the invention consequently offers the possibility of a relatively simple configuration of the switching device for driving the same and also the output circuit, which can easily be extended in modular circuitry manner, e.g. switching several and also different load circuits.

Appropriately said switching device is implemented as a microdevice in the form of a microrelay MR based on materials and methods such as are of a conventional nature in micromechanics and/or semiconductor manufacture.

Advantageously a selection is made for this purpose of a microrelay, e.g. based on silicon, which can have a suitable sandwich structure, e.g. similar to that for semiconductor components, and whose layers are process-structured in such a way that the switching, mechanical element is operable by electrostatic or piezoelectric forces, i.e. load change. A standard driving power can therefore be present in a range of approximately 10 æW. With regards to contact making or opening the contacts, said silicon microrelay can operate similar to a leaf spring function, a bender bar, etc. U.S. Pat. No. 5,638,946 discloses in exemplified manner a relay with bender bars.

The construction of the switching device as a microdevice also makes it possible to bring about an integrated construction with the sensor device or its matching electronics, constructions being conceivable as a component or subassembly, e.g. on the circuit board of the sensor device or as a SMD or also in the form of a chip, together with further matching electronics of the sensor device, as well as as a separate chip.

The galvanic separation between the control circuit and the load circuit, as well as between the terminals of the load circuit is retained as an important advantage when using the switching device in a sensor device according to the invention.

The appropriate use of a microrelay as the switching device in a sensor device makes it possible to eliminate a common potential to the driving circuit and the load circuit, so that high flexibility can be achieved with regards to the driving and wiring of load circuits.

It is also possible to implement an action direction reversal.

As a result of the high input impedance of the microrelay and the galvanic separation between the control circuit and the load circuit, the action direction reversal can take place in simple manner by a corresponding insertion of the MR at different positions in the circuit diagram, without requiring additional components or further wiring arrangements for attaining this flexibility. Therefore layout expenditure and the size of the resulting subassembly for the sensor device can be kept at a minimum, particularly as all the components can be in the form of SMDs.

An important advantage compared with the use of conventional relays is brought about with the microrelay as a result of its high vibration resistance, which reduces error probability and significantly extends the range of uses and applications.

The design of the switching device in the output circuit of a sensor device with a microrelay consequently not only makes it possible to implement the advantages of components and subassemblies previously used in the prior art, but also in surprising manner allows novel, significantly simplified driving and switching possibilities. This also applies with regards to multichannel designs of the sensor device output circuit.

The invention is described in greater detail hereinafter relative to diagrammatic representations of the switching device, he internal structure thereof, together with the external drive possibilities and both internal and external switching or circuit configurations. In the drawings show:

FIGS. 1a, 1b The diagrammatic structure of a microrelay with a separate signal input and the shortened, symbolic representation.

FIG. 1c the symbolic representation of a microrelay without a separate signal input with drive by means of the supply voltage.

FIGS. 1d, 1e Design possibilities for a microrelay on a chip with the switching element as a normally open contact or closer.

FIGS. 2a, 2b he symbolic representation of a microrelay as a normally closed contact or opener with a separate signal input and also without a separate signal input.

FIGS. 3a, 3b The basic external wiring possibilities for a microrelay.

FIGS. 4a, 4b The simplification of the output terminals of a microrelay with a three-point terminal and internal galvanic connection, as well as external wiring possibilities.

FIGS. 5a, 5b An analogous embodiment to FIG. 4, with simplified load circuit.

FIGS. 6a, 6b Embodiments of a microrelay with internal galvanic connection and action direction reversal.

FIGS. 7a, 7b The implementation of a push-pull output of the sensor device as a three-point sensor based on two microrelays.

FIGS. 8a, 8b, 8c The implementation of two-channel embodiments of the sensor device by means of two, substantially parallel-connected microrelays, in part with an action direction reversal.

FIGS. 9a, 9b, 9c 9a a general switching stage; 9b, c connection possibilities for the microrelay for different action directions.

FIGS. 10a, 10b possibilities of the programmable action direction reversal of a microrelay via bridge sections or a rectifier bridge.

The sensor device can also be looked upon as being formed by a subassembly with the corresponding transducer, e.g. an inductive sensor, with which is associated corresponding adaptation or matching electronics with an output circuit. This output circuit has at least one corresponding switching device, which is preferably a microrelay MR and has at least one switching element for switching the following load circuit.

FIGS. 1a to 1e show in simplified, symbolic form a corresponding microrelay 1. Brief reference is also being made to the possibilities of constructing the microrelay as a chip with external wiring alternatives.

FIGS. 1a to 1e in exemplified manner relate to the microrelay 1 as a normally open contact or closer.

FIG. 1a diagrammatically shows the microrelay 1 with its terminals, the bounded block showing an amplifier 3 continuously supplied with a supply voltage between the terminals VDD and VSS. This amplifier 3 receives an input signal 4 and on the output side acts on the switch 2, which is shown in FIG. 1a in the opened state.

In the further description hereinafter the microrelay 1 is symbolically used in its function as a closer according to FIG. 1b.

FIG. 1c shows another embodiment of a microrelay 1 as a closer, where the separate control input has been omitted and the switching function is implemented by the application of a corresponding supply voltage or the attaining of a corresponding voltage difference.

FIGS. 1d and 1e show in exemplified manner two embodiments for a chip-internal solution with respect to the microrelay and its external wiring.

In the example according to FIG. 1d an input of the amplifier 3 is applied to the terminal VDD. Corresponding to FIG. 1e, said other embodiment shows an input of the amplifier, constructed as an inverter, at the terminal VSS. The other supply voltage terminal VDD is applied to the inverter across a diode 8 to prevent pole confusion. In the example according to FIG. 1e, the diode 8 could also be omitted.

Figure 2A:
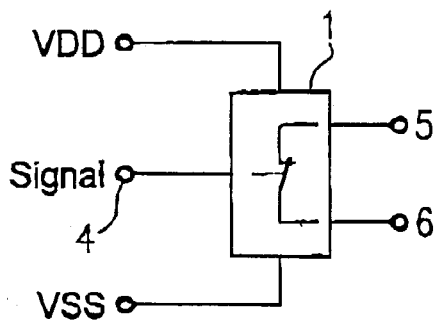
Figure 2B:
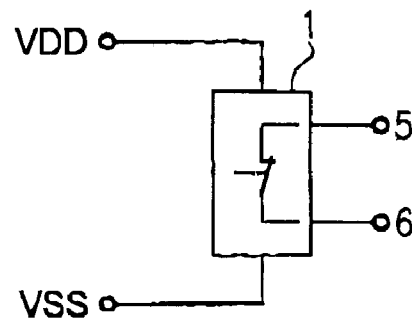

In analogous manner the microrelay 1 can also be constructed as a normally closed contact or opener and this is shown in FIGS. 2a, 2b. Corresponding to the embodiment according to FIG. 2a, the microrelay 1 is equipped with a separate signal input 4 and with a continuous voltage supply between VDD and VSS. In accordance with FIG. 2b this separate signal input can be dropped, the control then taking place by means of the corresponding supply voltage and e.g. an activation on opening the switch can be brought about if there is a control voltage at the input terminals of the microrelay.

A chip-internal configuration can be implemented with the microrelay as an opener in the same way as with the closer according to FIGS. 1d and 1e.

Figure 3A:
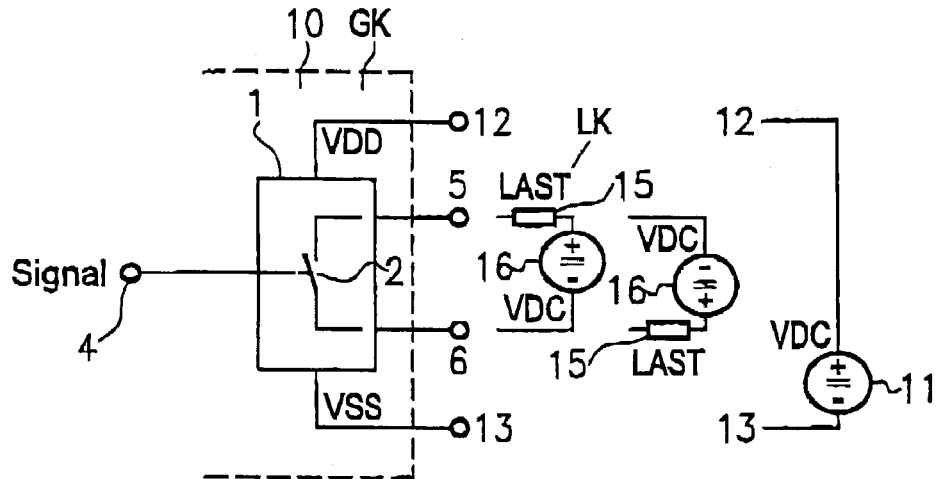
Figure 3B:
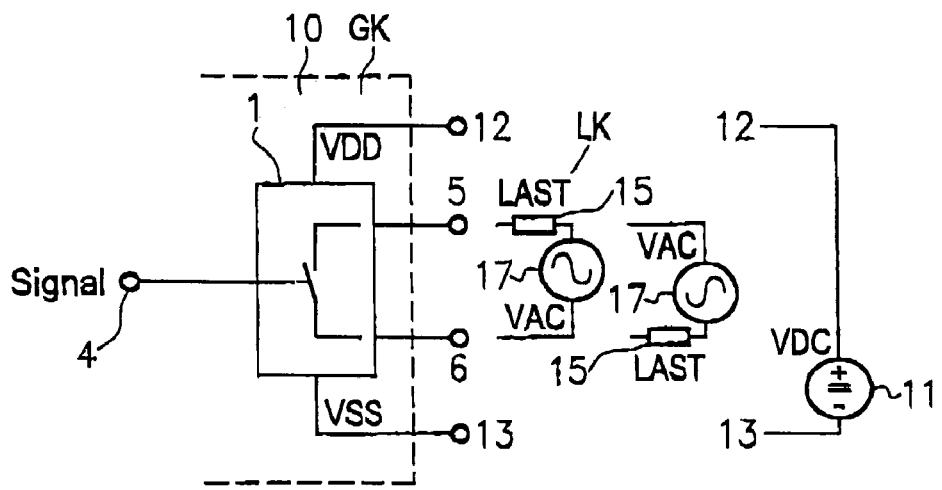

FIGS. 3a and 3b diagrammatically show a single-channel application of the sensor device or the sensor device output circuit 10 with fixed action direction.

The output circuit 10, which can also be referred to as equipment circuit GK, has on one side a microrelay 1 corresponding to FIG. 1b. This microrelay receives its continuous d.c. voltage supply across the connection terminals 12, 13 from a d.c. voltage source 11. The load circuit is illustrated diagrammatically with a load 15 and a d.c. voltage source 16, which can be switched via the output terminals 5 and 6 of the microrelay 1. As a result of the galvanic separation at switch 2 of microrelay 1 the load circuit can be placed at a random potential falling within the dielectric strength of the microrelay 1.

FIG. 3b shows the same construction as FIG. 3a, but the load circuit LK is diagrammatically shown with an a.c. voltage source 17. This makes it clear that as a result of the galvanic isolation with respect to the control circuit of the microrelay 1, the load circuit LK can also be supplied with a.c. voltage. Thus, the load circuit LK can be supplied with a random time-variant and/or randomly poled voltage and is consequently also suitable for connected data lines or interfaces.

Thus, FIGS. 3a and 3b diagrammatically illustrate the application of the microrelay 1 with the highest degree of freedom with regards to the wiring of the output circuit 10 or equipment circuit GK with the load circuit LK. However, the application possibilities also require extensive, external wiring costs.

On the basis of the circuits according to FIGS. 3a and 3b the following circuit or switching possibilities and wiring possibilities can be implemented. As shown, the output circuit 10 or equipment circuit GK and the load circuit LK have no galvanic connection. The output circuit 10 and load circuit LK have a galvanic connection outside the sensor device or the output circuit 10 or within said output circuit 10, e.g. an identical reference potential or a summation of voltages in the case of an unequal reference potential. In the case of a galvanic connection, the output 5 or 6 left free can be designed in either a p-switching or n-switching manner. The term p-switching is understood to be switching with respect to a positive potential and n-switching with respect to a negative potential.

The output circuit 10 or the load circuit can have different voltage values or amplitudes. The output circuit and load circuit can be poled in the same or opposite directions. The load circuit can also be of varying polarity relative to the output circuit.

Figure 4A:
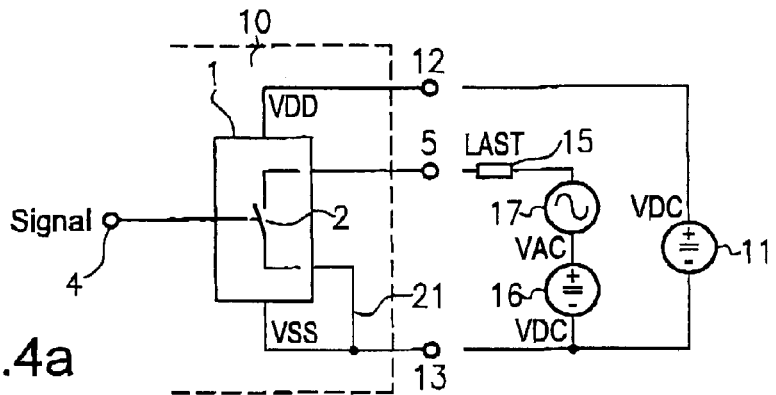
Figure 4B:
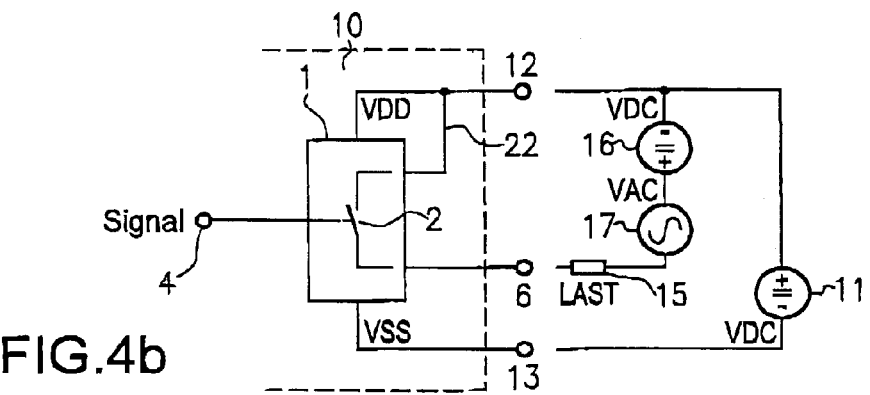
Figure 5A:
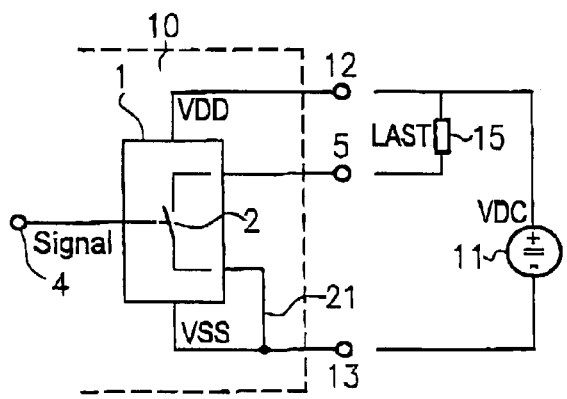
Figure 5B:
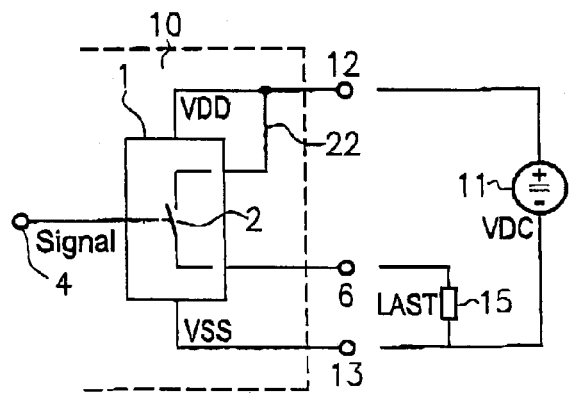

The universal connection possibilities with external wiring of the load circuit and the voltage supply circuit shown in FIGS. 3a and 3b can also be significantly simplified for applications with a galvanic connection between the output circuit 10 or equipment circuit GK and the load circuit LK, which is shown in FIGS. 4a and 4b, as well as with further simplification in FIGS. 5a, 5b.

If a galvanic connection is necessary between the sensor device output circuit 10 and the load circuit LK, this can advantageously be brought about internally within the sensor device or the output circuit 10 through a galvanic connection 21 between the switch 2 of the microrelay 1 and the connection terminal 13 with respect to the potential VSS. The further wiring of the load circuit or load 15 is then at the connection terminal 5 and is also at the potential of the connection terminal 13. In the example according to FIG. 4a this takes place by means of a d.c. voltage source 16 in the load circuit LK and on which is superimposed an a.c. voltage of the a.c. voltage source 17.

It is pointed out that the same reference numerals in the drawings relate to the same subassemblies and components, so that for simplification reasons not all the subassemblies do have to appear in a corresponding drawing. For simplification reasons and for an internal connection between the connection terminals 6 and 13 according to FIG. 3a, it is possible to have a three-wire sensor in a typical non-conforming connection or terminal type according to FIG. 4a.

The variant according to FIG. 4b differs from that of FIG. 4a in that the internal galvanic connection 22 within the output circuit 10 passes to the positive connection terminal 12. Therefore the load circuit LK is at the output terminal 6 and the connection terminal 12, which is at the positive potential of the d.c. supply voltage VDC 11.

In the embodiments according to FIGS. 4a and 4b, the potential applied to the load circuit LK can be inside or outside the d.c. supply voltage 11 in accordance with the wiring shown.

The sensor device output circuit 10 equipped with three terminals and shown in FIGS. 4a and 4b and which can consequently also be referred to as a three-wire sensor, bearing in mind the internal galvanic connection 21 or 22, allows the same advantages referred to in connection with FIGS. 3a, 3b. In particular, the output left free can be designed in p or n-switching manner. The load circuit LK and output circuit 10 can have different voltage values and amplitudes and/or can be poled in the same or opposite directions. With respect to the output circuit 10, the load circuit LK can have a varying polarity and can be supplied with a random time-variant and/or randomly poled voltage.

A further simplification is illustrated in the examples according to FIGS. 5a and 5b. According to FIG. 5a the load 15 of the load circuit is applied to the output terminal 5 and also to the connection terminal 12 at positive potential of the d.c. supply voltage 11. In the case of FIG. 5b the load 15 is between the output terminal 6 at the connection terminal 13 or negative potential of the d.c. supply voltage 11.

Thus, in this simplified variant it is possible to implement the most standard embodiments, which correspond to standard connection types with random combinations of n-switching, p-switching, opener and closer.

Figure 6A:
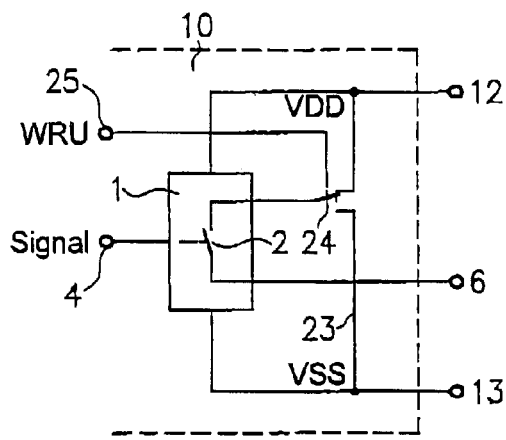

A further development of the output circuit 10 according to FIGS. 4a, 4b is shown in FIG. 6a. In the embodiment according to FIG. 6a the reference potential for the load circuit can now be reversed. For this purpose between the supply potential VDD at the connection terminal 12 and the potential VSS at the connection terminal 13 a reversing switch 24 is provided, which can be reversed by means of an action direction reversal WRU at the WRU terminal 25. On driving the microrelay 1 and closing the switch 2, in the position according to FIG. 6a the output terminal 6 for the load circuit passes to potential VDD. On operating the action direction reversal and on switching the reversing switch 24, potential VSS can be applied to the output terminal 6.

Thus, in this way the corresponding output 6 of microrelay 1 can, as desired, be applied to one or other pole of the supply voltage, i.e. can be designed in p-switching and n-switching manner. The reversing switch 24 can be constructed in random, suitable form, e.g. as an internal bridge, as a switching logic or other internal wiring programming.

Figure 6B:
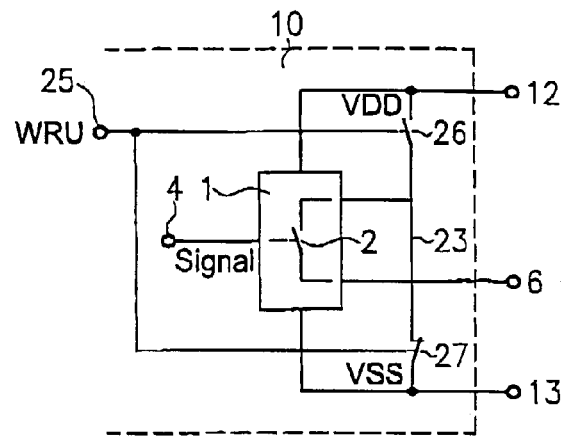

In place of the reversing switch 24 according to FIG. 6a the same functionality can be achieved with internal wiring according to FIG. 6b through the use of two simple switches 26, 27, which can also be constructed as further microrelays.

Thus, the advantages and wiring possibilities referred to in connection with FIGS. 4a, 4b are retained, but are further extended with respect to the p-switching or n-switching manner.

Figure 7A:
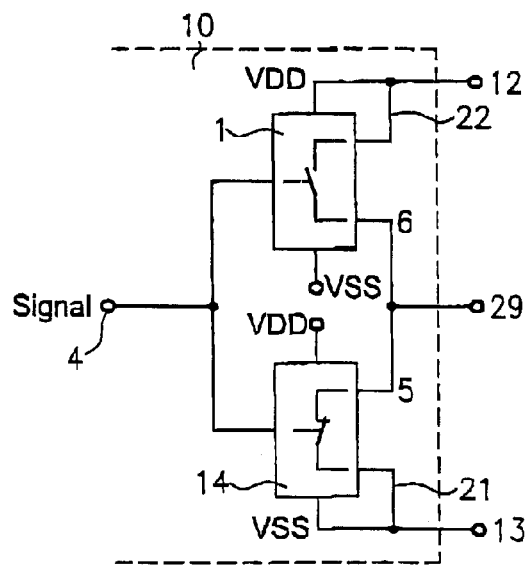

For designing the three-wire sensor with a push-pull output 29, in the embodiment according to FIG. 7a the sensor device output circuit 10 is equipped with a second microrelay 14 in the form of an opener. The upper microrelay 1 corresponds to the internal wiring according to FIG. 4b, whilst the lower, second microrelay 14 has an internal wiring in accordance with FIG. 4a, the microrelay being constructed as an opener. The corresponding terminals 5 and 6 of the two microrelays are led to the push-pull output 29. The same driving signal is applied across a signal terminal 4 to both microrelays 1, 14.

In accordance with FIG. 7a, in one switching state the potential VSS from connection terminal 13 is applied to the push-pull output 29. In the other switching state the microrelay 14 opens and closes the microrelay 1, so that the push-pull output 29 receives the potential VDD from the connection terminal 12.

Through the possibility of switching the load between VDD and output or between VSS and output, the action direction can be chosen with this internal construction. Thus, the push-pull output 29 can operate in alternating p and n-switching manner. As a result of this operating mode no further recovery diode is required with inductive loads. Particularly in the case of high switching frequencies, this reduces the power loss to be dissipated in the sensor device.

A further increase in the functionality of the circuit according to FIG. 7a is brought about in that a controllable action direction reversal WRU is additionally provided at a terminal 25. In the example according to FIG. 7b, the WRU terminal 25 and the signal terminal are on a logic 28, which drives the particular microrelay 1, 14. The wiring according to FIG. 7b with a controlling WRU and possibly additional logic consequently allows output variants with random combinations of n-switching, p-switching, opener and closer in a sensor or in its output circuit 10.

The control logic e.g. also permits the use of similar microrelays, so that e.g. both microrelays can, as desired, be designed as a closer or opener. Alternatively to the configuration shown in FIG. 7b, the WRU can also be implemented by internal or external bridges.

Figure 7B:
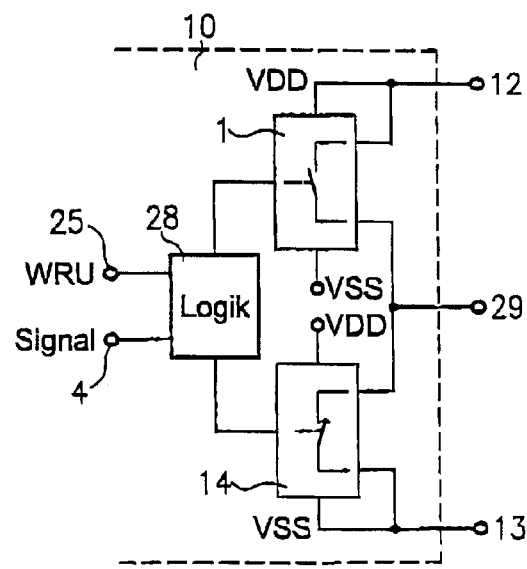
Figure 8A:
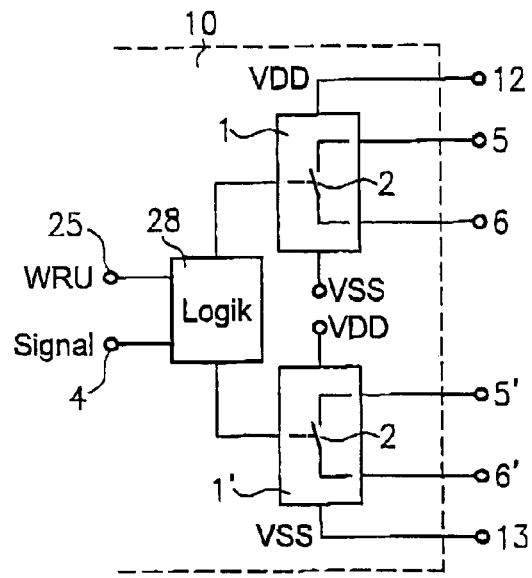

The circuit shown in FIGS. 7a, 7b can advantageously be extended in relatively simple manner to a two-channel, potential-free form. For this purpose e.g. the two output terminals of the microrelays 1, 14 shown in FIG. 7a are passed to the outside, as illustrated in FIG. 8a. Thus, there are two independent, galvanically isolated outputs 5, 6 or 5', 6' and in the example according to FIG. 8a, due to the logic circuit 28 with signal terminal 4 and WRU terminal 25, the two microrelays 1, 1' can be driven in the same or opposite directions.

Figure 8B:
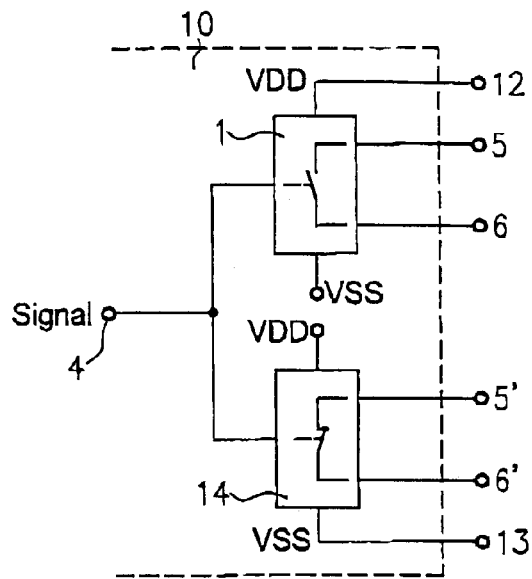

In order to obtain a simple, antivalent output with equidirectional driving of the two-channel sensor device, as shown in FIG. 8b for the lower microrelay 14, it is merely necessary to design the microrelay 1' according to FIG. 5a as an opener and the logic circuit is eliminated.

The characteristics and advantages shown for the single-channel versions according to FIGS. 3a, 3b, apply for each individual channel in unchanged form in the embodiment according to FIG. 8a. It is also pointed out that the two load circuits LK can be wired together just as freely in this two-channel form of the output stage 10, as described with respect to the output circuit 10 and load circuit for the versions according to FIGS. 3a, 3b.

In the embodiment illustrated in FIG. 8b, the upper microrelay 1 is designed as a closer and the lower microrelay 14 as an opener, the relays 1, 14 being controllable by means of a common signal line 4 and therefore switch in antivalent manner. Both output lines 5, 6 or 5', 6' of the microrelays are passed to the outside in this example.

Figure 8C:
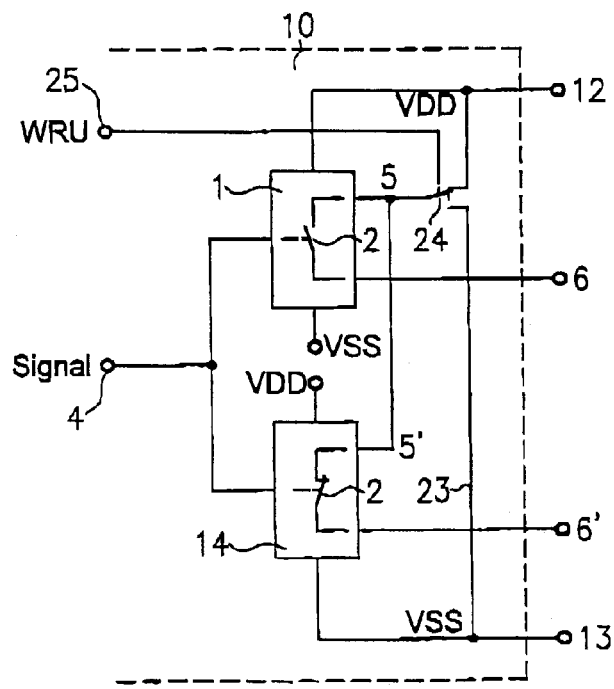

In much the same way as a random wiring with a reference potential could be achieved for a single-channel version, e.g. in FIG. 6a, this can also be implemented for the two-channel solution, such as is shown in FIG. 8c. Supplementing the solution according to FIG. 8b, the random wiring with the corresponding reference potential VDD or VSS is brought about in that internally the switch 24 produces a connection either with the connection terminal 12 or with the connection terminal 13 (FIG. 8c).

Instead of the reversing switch 24 driven by means of action direction reversal, it is also possible to implement a solution by means of individual switches 26, 27, as shown in FIG. 6b.

Important advantages arise for the control and output circuit of a sensor device when using one or more microrelays as a result of the possibility of achieving a simplified drive, because a corresponding semiconductor-based microrelay normally has a high-ohmic input and also provides the galvanic separation between control circuit and load circuit. In the case of conventional electromechanical relays such drive possibilities would not be conceivable due to excessively high driving currents.

Figure 9A:
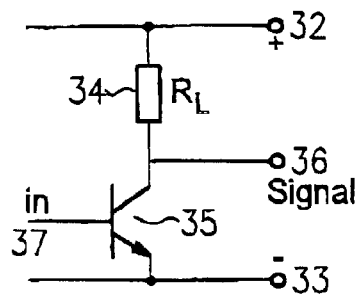

FIG. 9a shows a simplified configuration of the input for a conventional electromechanical relay. Between the supply terminals 32 and 33 are provided in series a load resistor 34 with a transistor 35, whose emitter passes to the terminal 33. On driving via the base terminal 37, a corresponding signal is obtained at terminal 36. If with this configuration use was made of a conventional electromechanical relay, this would take the place of the load resistor 34. However, on inserting a conventional relay via terminals 36 and 33, the resistor 34 would have to be so low that this mode would be made impossible due to the much too high shunt current. Also in the case of other alternatives, e.g. the driving of an electromechanical relay via the output stages of corresponding operational amplifiers, comparators or by means of a logic, they would have to be designed for generating high drive currents. A further difficulty arises if an action direction reversal is desired for the corresponding relay, because this in all cases requires further components and increases costs.

However, when using a microrelay 1, wiring of the input can be performed relatively simply and inexpensively.

Figure 9B:
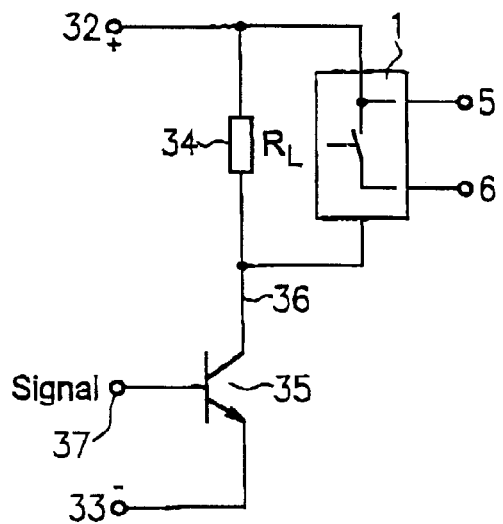

With a general switching stage, as shown in FIG. 9a, it is possible in the manner shown in FIG. 9b to connect the microrelay 1 between the positive terminal 32 and the terminal 36 located at the collector of transistor 35.

Figure 9C:
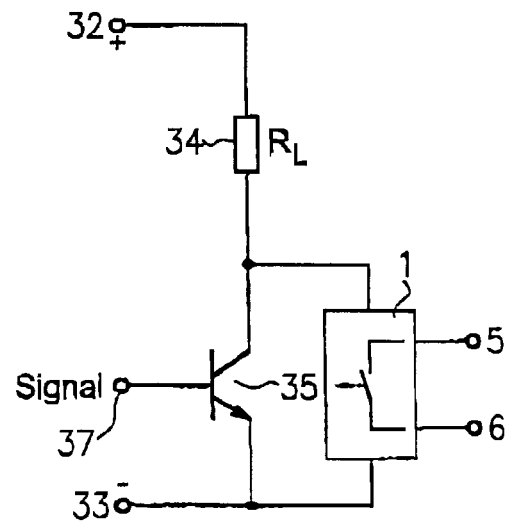

However, in the example according to FIG. 9c the microrelay 1 is at the negative supply voltage 33. Due to this freedom of choice for the input wiring of the microrelay 1, without additional components and therefore very inexpensively, a desired action direction reversal can be brought about. As the input resistance of the microrelay 1 can always be assumed as much higher than the resistance value of the load resistor 34, no problems arise regarding the dimensioning of the load resistor.

On the basis of the circuits according to FIGS. 9b and 9c, it is shown how an action direction reversal can be brought about solely by varying the position of the microrelay 1 in the circuit diagram. The microrelay 1 can be both parallel to the load resistor 34 and also parallel to the transistor 35. This applies quite independently of whether the microrelay 1 is implemented as a closer or opener.

Particularly in view of the standard constraint in the automation industry that e.g. in the case of a power failure the sensor output must assume a predetermined switching position, it is clear that all these variants can be used in practice.

If for the matching or adaptation electronics of a sensor device use is made of a corresponding substrate layout for said electronics, it is possible to implement all combinations of action direction and switch type, n-switching, etc. in that the corresponding microrelay is in simple manner placed on the appropriately positioned contact faces of the corresponding layout, without having to provide further components. Therefore the desired function is brought about solely by the positioning of the corresponding microrelay on the circuit support or carrier for the output circuit electronics.

Figure 10A:
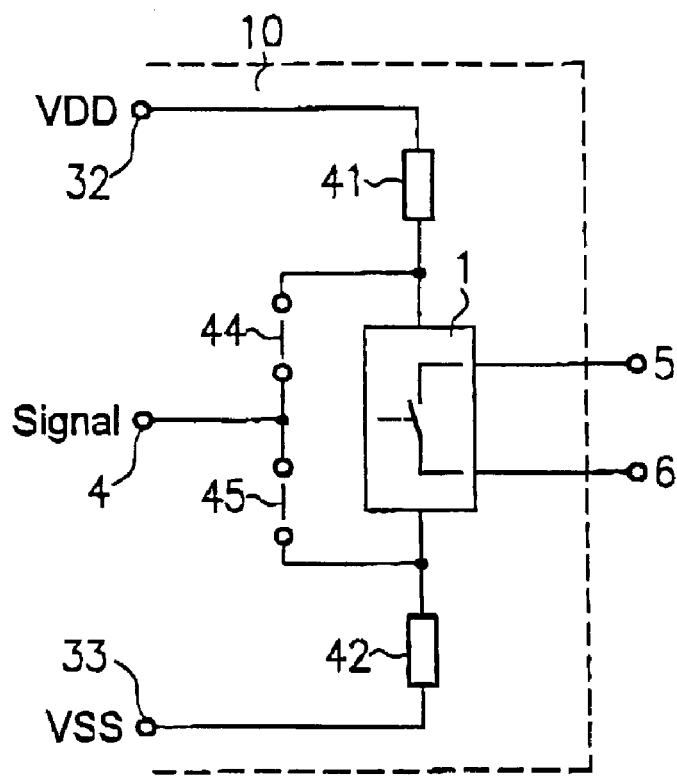
Figure 10B:
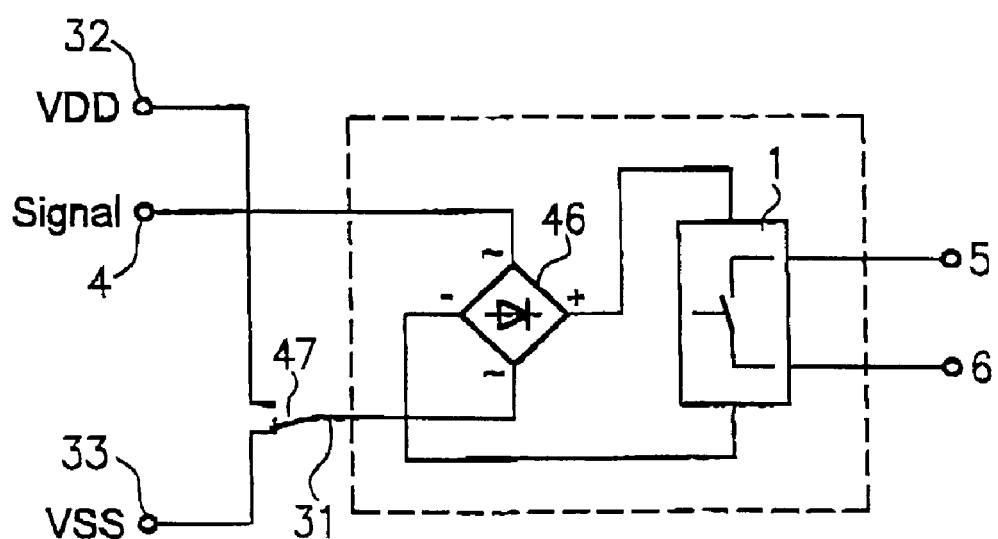

Further advantageous variants for bringing about an action direction reversal of the microrelay 1 are shown in FIGS. 10a and 10b. In FIG. 10a the wiring-of the input of the microrelay 1 takes place by means of a current-limiting element, e.g. resistor 41, which is on the one hand at the supply voltage VDD 32 and on the other at the microrelay 1 and a bridge 44 provided in parallel thereto. The bridge 44 is placed with the other pole at the signal terminal 4. The other supply voltage VSS from terminal 33 is supplied across a further current-limiting element, e.g. resistor 42, to the microrelay 1 and a further bridge 45. This further bridge 45 also has its other pole at the signal terminal 4. Thus, a programmable action direction of the microrelay 1 can be brought about by means of the bridges 44, 45. This e.g. takes place by separating the corresponding bridge or adding or closing the corresponding bridge. Such a terminal change can take place in fixed form during sensor manufacture, or can, as desired, be performed at the place of use by the user. These bridges 44, 45 can be accessible from the outside, e.g. in a terminal box.

A controllable action direction reversal of the microrelay 1 is illustrated in FIG. 10b, a bridge rectifier being connected upstream of the microrelay 1.

As a result of the special characteristics of the microrelay 1, such as freedom from potential at the control input, galvanic separation between the input and output side and high input impedance, a WRU function can be implemented in a particularly simple manner with a rectifier bridge, specifically a bridge rectifier 46.

The corresponding configuration is diagrammatically shown in FIG. 10b. The rectifier bridge 46 has its d.c. voltage terminals at the microrelay 1. The signal terminal 4 and, reversibly via the reversing switch 47, a corresponding terminal of the supply voltage 32 or 33 is applied to the rectifier bridge.

When using a conventional electromechanical relay this would not constitute appropriate circuitry technology for driving the relay.

In the case of the configuration according to FIG. 10b, the action direction reversal can be brought about either by, as desired, inserting a bridge, which can be externally accessible, or by a control logic at the corresponding control input 31. With corresponding presettings, this control can also influence the action direction reversal during continuous sensor device operation. A fixed wiring of the control input with a reference potential is also possible.

The invention claimed is:

1. Sensor device comprising:
a sensor system for detecting a measured quantity,
a switching device of the sensor system for switching a load circuit,
a control circuit with control terminals with which the sensor system is in an operative connection for driving the switching device,
the switching device having an output circuit switchable with the aid of the control circuit and galvanically separated therefrom and provided with output terminals in which there is a galvanic separation in at least one switching state,
the switching device being constructed for almost wattless drive purposes as a microrelay, the microrelay having at least one movable and deformable switching element with a micromechanical structure,
the sensor system detecting objects and fluid substances, and
the load circuit being in direct operative connection with the output circuit of the switching device.

2. Sensor device according to claim 1, wherein the sensor system is a proximity switch, selected from the group consisting of inductive, capacitive, optoelectronic, ultrasonic and magnetic field proximity switches.

3. Sensor device according to claim 1, wherein the sensor system is a level sensor.

4. Sensor device according to claim 1, wherein the switching device is a silicon microrelay.

5. Sensor device according to claim 1, wherein the switching element is electrostatically operable.

6. Sensor device according to claim 1, wherein the switching element is piezoelectrically operable.

7. Sensor device according to claim 1, wherein there is a separate control input for driving the switching device.

8. Sensor device according to claim 1, wherein there is a drive of the switching device coupled to a voltage supply of the switching device.

9. Sensor device according to claim 1, wherein the drive of the switching device is programmable.

10. Sensor device according to claim 1, wherein the drive of the switching device is constructed in a fixed wired manner.

11. Sensor device according to claim 1, wherein the terminals of the control circuit of the switching device and the output terminals for the load circuit provide a potential free switching of the load circuit.

12. Sensor device according to claim 1, wherein an output terminal of the switching device for the load circuit is connectable internally in the switching device with a supply voltage terminal.

13. Sensor device according to claim 1, wherein for a switching of the load circuit with random reference to a supply voltage of the switching device, a separate voltage source is provided in the load circuit.

14. Sensor device according to claim 1, wherein the load circuit is connectable to a supply voltage terminal of the switching device.

15. Sensor device according to claim 1, wherein the output circuit is passed to the outside as a three-wire terminal.

16. Sensor device according to claim 15, wherein two terminals of the three-wire terminal are at a supply voltage, a drivable reversing switch is provided for the switchable load circuit terminal and the switchable load circuit terminal is connected by the reversing switch in alternative manner with one of the supply voltage terminals.

17. Sensor device according to claim 15, wherein the switchable load circuit terminal is connectable by two switches to one of the supply voltage terminals, the switches being controllable in opposite directions.

18. Sensor device according to claim 1, wherein for a two-channel control of load circuits two microrelays are driven in parallel with a drive within the output circuit and at least the output terminals of the load circuits are led to the outside.

19. Sensor device according to claim 18, wherein two microrelays can be switched in the same direction.

20. Sensor device according to claim 18, wherein two microrelays can be switched in opposite directions.

21. Sensor device according to claim 1, wherein the drive of the load circuit includes an action direction reversal device.

22. Sensor device according to claim 21, wherein an exclusive-or element is provided in the drive circuit of the microrelay for reversing the action direction of the latter.

23. Sensor device according to claim 21, wherein for choosing an action direction of the microrelay, closable and separable bridge sections and resistors are provided.

24. Sensor device according to claim 1, wherein a desired function of the microrelay is obtained essentially without additional components, by repositioning the microrelay in the circuit.

25. Sensor device comprising:
a sensor system for detecting a measured quantity,
a switching device of the sensor system for switching a load circuit,
a control circuit with control terminals with which the sensor system is in an operative connection for driving the switching device,
the switching device having an output circuit switchable with the aid of the control circuit and galvanically separated therefrom and provided with output terminals in which there is a galvanic separation in at least one switching state,
the switching device being constructed for almost wattless drive purposes as a microrelay, the microrelay having at least one movable and deformable switching element with a micromechanical structure, the drive of the microrelay being in a fixed wired form,
the sensor system detecting objects and fluid substances, and
the load circuit being in direct operative connection with the output circuit of the switching device.

* * * * *